United States Patent
Kenchaiah et al.

(10) Patent No.: US 11,078,329 B2
(45) Date of Patent: Aug. 3, 2021

(54) FUNCTIONAL PHENYLENE ETHER OLIGOMER, CURABLE AND THERMOSET COMPOSITIONS PREPARED THEREFROM

(71) Applicant: SABIC GLOBAL TECHNOLOGIES B.V., Bergen op Zoom (NL)

(72) Inventors: Lohith Kenchaiah, Bangalore (IN); Rajesh Chowdhury, Bangalore (IN); Gurunath Pozhal Vengu, Bangalore (IN); Gaurav Mediratta, Bangalore (IN); Ranjith Choorikkat, Bangalore (IN)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 355 days.

(21) Appl. No.: 16/392,871

(22) Filed: Apr. 24, 2019

(65) Prior Publication Data

US 2019/0338072 A1   Nov. 7, 2019

(30) Foreign Application Priority Data

May 7, 2018   (EP) .................................... 18171054

(51) Int. Cl.
   *C08G 65/48*   (2006.01)
   *B29C 45/00*   (2006.01)
   *B29K 71/00*   (2006.01)

(52) U.S. Cl.
   CPC .......... *C08G 65/48* (2013.01); *B29C 45/0001* (2013.01); *B29K 2071/12* (2013.01)

(58) Field of Classification Search
   CPC ...... C08G 65/48; B29C 45/00; B29K 2071/12

USPC .......................................................... 525/390
   See application file for complete search history.

(56) References Cited

U.S. PATENT DOCUMENTS

| | | |
|---|---|---|
| 3,018,290 A | 1/1962 | Sauers et al. |
| 3,562,223 A | 2/1971 | Bargain et al. |
| 3,920,587 A | 11/1975 | Watkinson |
| 4,211,860 A | 7/1980 | Stenzenberger |
| 4,211,861 A | 7/1980 | Stenzenberger |
| 4,304,705 A | 12/1981 | Heilmann et al. |
| 4,540,763 A | 9/1985 | Kirchhoff |
| 4,642,126 A | 2/1987 | Zador et al. |

(Continued)

FOREIGN PATENT DOCUMENTS

| | | |
|---|---|---|
| JP | H06136248 A | 5/1994 |
| JP | 2003238676 A | 8/2003 |

(Continued)

*Primary Examiner* — Michael Bernshteyn
(74) *Attorney, Agent, or Firm* — Cantor Colburn LLP

(57) ABSTRACT

A functional phenylene ether oligomer of the structure

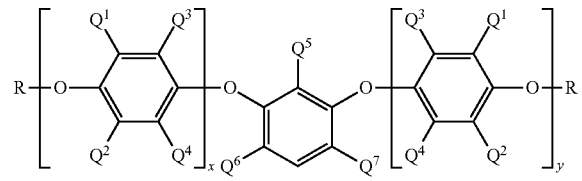

wherein $Q^1$, $Q^2$, $Q^3$, $Q^4$, x, y, and R are as defined herein. A curable composition includes the functional phenylene ether oligomer, and a thermoset composition includes a cured product derived from the curable composition.

15 Claims, 3 Drawing Sheets

(56) References Cited

U.S. PATENT DOCUMENTS

| | | |
|---|---|---|
| 4,642,329 A | 2/1987 | Kirchhoff et al. |
| 4,652,274 A | 3/1987 | Boettcher et al. |
| 4,661,193 A | 4/1987 | Kirchhoff et al. |
| 4,665,137 A | 5/1987 | Percec |
| 4,724,260 A | 2/1988 | Kirchhoff et al. |
| 4,743,399 A | 5/1988 | Kirchhoff et al. |
| 5,115,043 A * | 5/1992 | Yates, III ............ C08G 65/485 525/390 |
| 5,543,516 A | 8/1996 | Ishida |
| 6,352,782 B2 | 3/2002 | Yeager et al. |
| 6,627,704 B2 | 9/2003 | Yeager et al. |
| 6,693,149 B2 | 2/2004 | Yin et al. |
| 6,995,195 B2 | 2/2006 | Ishii et al. |
| 7,193,019 B2 | 3/2007 | Norisue et al. |
| 7,951,877 B2 | 5/2011 | Nakano et al. |
| 8,309,655 B2 * | 11/2012 | Kamalakaran .......... C08L 71/12 525/88 |
| 2001/0053820 A1 * | 12/2001 | Yeager ................ C08L 2666/04 525/186 |
| 2007/0129502 A1 * | 6/2007 | Kawabe ................ C08F 290/06 525/391 |
| 2008/0071036 A1 * | 3/2008 | Delsman ............... C08L 71/126 525/396 |
| 2011/0294966 A1 | 12/2011 | O'Brien et al. |

FOREIGN PATENT DOCUMENTS

| | | |
|---|---|---|
| JP | 2003252833 A | 9/2003 |
| JP | 2003268227 A | 9/2003 |
| JP | 3874096 | 1/2007 |
| JP | 4009826 | 11/2007 |
| JP | 4196157 | 12/2008 |
| JP | 2014189637 A | 10/2014 |
| WO | 2017067123 A1 | 4/2017 |
| WO | 2018060803 | 4/2018 |
| WO | 2018060811 | 4/2018 |

* cited by examiner

FUNCTIONAL PHENYLENE ETHER OLIGOMER, CURABLE AND THERMOSET COMPOSITIONS PREPARED THEREFROM

BACKGROUND

Thermosetting resins are materials that cure to form very hard plastics. These materials that can be used in a wide variety of consumer and industrial products. For example, thermosets are used in protective coatings, adhesives, electronic laminates (such as those used in the fabrication of computer circuit boards), flooring, and paving applications, glass fiber-reinforced pipes, and automotive parts (including leaf springs, pumps, and electrical components). Relative to other types of plastics, cured thermosets are typically brittle. It would therefore be desirable to retain the good properties of thermosets and also reduce their brittleness. Poly(arylene ether) resins, sometimes called polyphenylene ethers, have been disclosed as additives to reduce the brittleness (improve the toughness) of cured thermosets. For example, it is known to combine certain poly(arylene ether) resins with thermosets resins such as epoxies, cyanate esters, maleimides, acrylates, and benzoxazine resins. It would also be desirable to provide a curable phenylene ether oligomer that exhibits excellent dielectric properties and heat performance.

BRIEF DESCRIPTION

A functional phenylene ether oligomer is of the structure

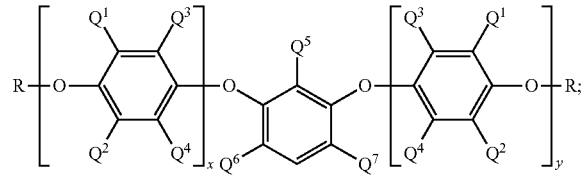

wherein $Q^1$ and $Q^2$ are each independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; $Q^3$ and $Q^4$ are each independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; $Q^5$, $Q^6$ and $Q^7$ are each independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms, preferably wherein $Q^5$, $Q^6$ and $Q^7$ are each methyl, x and y are each independently 0 to 30, provided that the sum of x and y is at least 2; and R is independently at each occurrence a group containing unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, or an allylhydroxypropyl.

A method of making the functional phenylene ether oligomer comprises oxidatively polymerizing a monohydric phenol in the presence of a catalyst and trisubstituted resorcinol, preferably trimethyl resorcinol, to provide a phenylene ether oligomer; and combining the phenylene ether oligomer with a compound comprising unsaturation to provide the functional phenylene ether oligomer.

A curable composition comprises the functional phenylene ether oligomer; and a curing promoter.

A thermoset composition comprises a cured product of the composition.

An article comprises the thermoset composition.

A method for the manufacture of a thermoset composition comprises curing the curable composition.

The above described and other features are exemplified by the following detailed description.

BRIEF DESCRIPTION OF THE DRAWINGS

The following figures represent exemplary embodiments.

DETAILED DESCRIPTION

Figure 1:
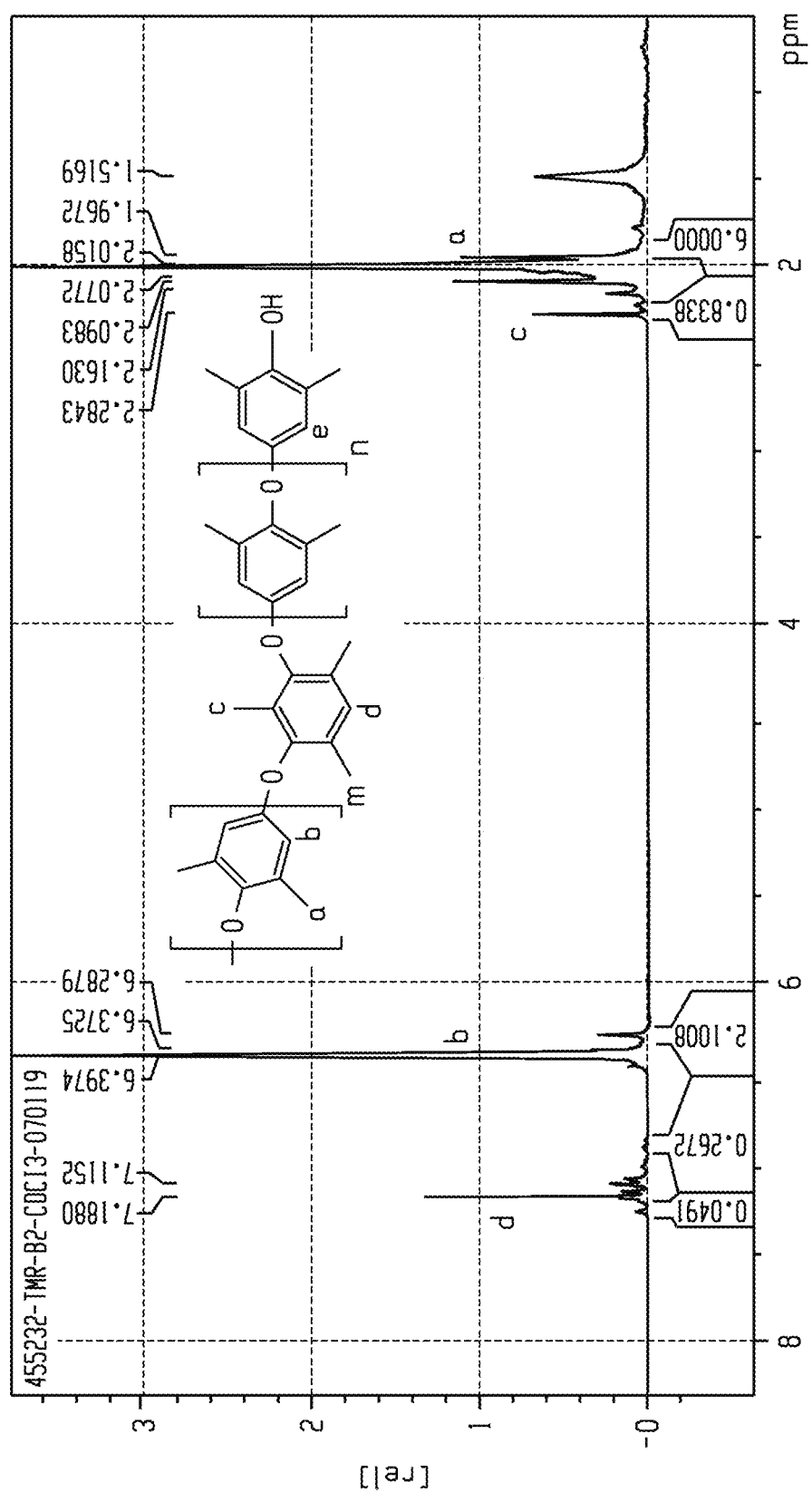
FIG. 1 shows a proton nuclear magnetic resonance ($^1$H NMR) spectrum of a hydroxyl-terminated poly(phenylene ether) including a trimethylresorcinol unit.

The present inventors have determined that phenylene ether oligomers derived from a trisubstituted resorcinol group (e.g., trimethyl resorcinol) and having particular functional end groups can be advantageous for incorporation into curable and thermoset compositions. Advantageously, the phenylene ether oligomers can be used to prepare thermoset compositions for a variety of applications.

Accordingly, an aspect of the present disclosure is a phenylene ether oligomer of the structure

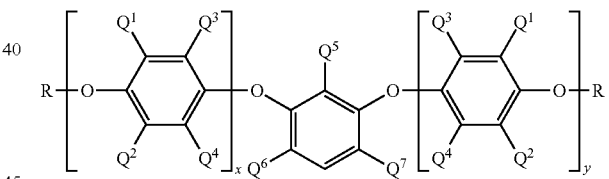

wherein $Q^1$ and $Q^2$ are each independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; $Q^3$ and $Q^4$ are each independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; $Q^5$, $Q^6$ and $Q^7$ are each independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms, preferably wherein $Q^5$, $Q^6$ and $Q^7$ are each methyl; x and y are each independently 0-30, provided that the sum of x and y is at least 2; and R is independently at each occurrence a group containing unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, or an allylhydroxypropyl. The values of x and y can be determined, for example, by $^1$H NMR spectroscopy. In particular, the value of the sum of x and y can be determined by $^1$H NMR spectroscopy. Additionally, the value of x or y when x or y is zero can be determined by $^1$H NMR spectroscopy.

As indicated in the above structure, the oligomer is a bifunctional phenylene ether oligomer. For example, it can have functional groups at both termini of the oligomer chain (i.e., having an average functionality of 2). Bifunctional polymers with functional groups at both termini of the polymer chains are also referred to as "telechelic" polymers.

In some embodiments, each R is a group containing unsaturation, and preferably each R is independently a vinyl benzyl group, an allyl group, a nitrile group, an acrylate group, or a methacrylate group.

In some embodiments, the phenylene ether oligomer comprises repeating units derived from 2,6-dimethylphenol, 2,3,6-trimethylphenol, and combinations thereof. In an embodiment, the phenylene ether oligomer comprises repeating units derived from 2,6-dimethylphenol. For example, the phenylene ether oligomer can be of the structure

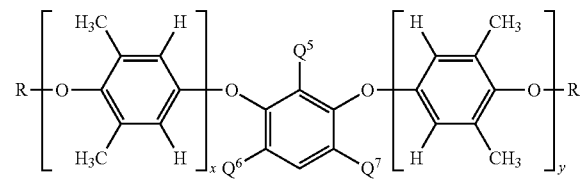

wherein $Q^5$, $Q^6$, $Q^7$, x and y are as defined above.

In some embodiments, $Q^5$, $Q^6$, and $Q^7$ are each methyl groups, and the phenylene ether oligomer is derived from trimethyl resorcinol. Accordingly, in some embodiments, the phenylene ether oligomer can be of the structure

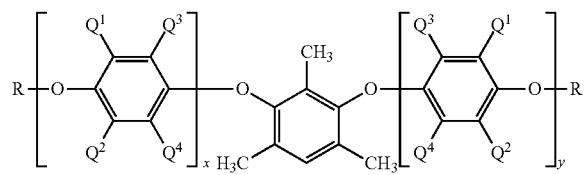

wherein $Q^1$, $Q^2$, $Q^3$, $Q^4$, x and y are as defined above.

In a specific embodiment, each occurrence of $Q^1Q^2$, $Q^5$, $Q^6$ and $Q^7$ are methyl and each occurrence of $Q^3$ and $Q^4$ are hydrogen, and the phenylene ether oligomer can be of the structure

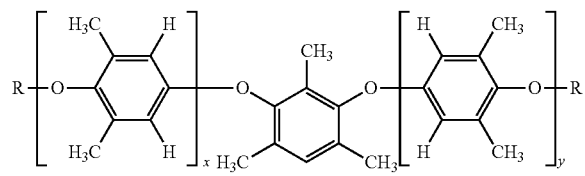

wherein R, x and y can be as described above, preferably wherein R is a group containing unsaturation, and preferably each R is independently at each occurrence a vinyl benzyl group, an allyl group, a nitrile group, an acrylate group, or a methacrylate group.

The oligomer can advantageously have an intrinsic viscosity of 0.04-0.2, preferably 0.06-0.09 deciliter per gram. Intrinsic viscosity can be determined by Ubbelohde viscometer at 25° C. in chloroform. The oligomer can also have a number average molecular weight (Mn) of 600-4,500 grams per mole, for example 600-3,500 grams per mole, or 1,000-5,000 grams per mole, or 1,000-3,500 grams per mole. Number average molecular weight can be determined by, for example, gel permeation chromatography relative to polystyrene standards in chloroform.

The phenylene ether oligomer of the present disclosure can be made by oxidatively polymerizing a phenol (e.g., 2,6-dimethyl phenol) in the presence of a catalyst and a trisubstituted resorcinol, preferably trimethyl resorcinol, by continuous addition of oxygen to a reaction mixture comprising the monomers, solvent, and polymerization catalyst to provide the phenylene ether oligomer. The molecular oxygen ($O_2$) can be provided as air or pure oxygen. The polymerization catalyst is a metal complex comprising a transition metal cation. The metal cation can include ions from Group VIB, VIIB, VIIIB, or IB of the periodic table, or a combination comprising at least one of the foregoing metals. Of these, chromium, manganese, cobalt, copper, or a combination comprising at least one of the foregoing ions can be used. In some embodiments, the metal ion is copper ion ($Cu^+$ and $Cu^{2+}$). Metal salts which can serve as sources of metal cations include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate, cuprous benzoate, and the corresponding manganese salts and cobalt salts. Instead of use of any of the above-exemplified metal salts, it is also possible to add a metal or a metal oxide and an inorganic acid, organic acid or an aqueous solution of such an acid and form the corresponding metal salt or hydrate in situ. For example, cuprous oxide and hydrobromic acid can be added to generate cuprous bromide in situ.

The polymerization catalyst further comprises at least one amine ligand. The amine ligand can be, for example, a monoamine, an alkylene diamine, or a combination comprising at least one of the foregoing. Monoamines include dialkylmonoamines (such as di-n-butylamine, or DBA) and trialkylmonoamines (such as N,N-dimethylbutylamine, or DMBA). Diamines include alkylenediamines, such as N,N'-di-tert-butylethylenediamine, or DBEDA. Suitable dialkylmonoamines include dimethylamine, di-n-propylamine, di-n-butylamine, di-sec-butyl amine, di-tert-butylamine, dipentylamine, dihexylamine, dioctylamine, didecylamine, dibenzylamine, methylethylamine, methylbutylamine, dicyclohexylamine, N-phenylethanolamine, N-(p-methyl)phenylethanolamine, N-(2,6-dimethyl)phenylethanolamine, N-(p-chloro)phenylethanolamine, N-ethylaniline, N-butyl aniline, N-methyl-2-methylaniline, N-methyl-2,6-dimethylaniline, diphenylamine, and the like, or a combination comprising at least one of the foregoing. Suitable trialkylmonoamines include trimethylamine, triethylamine, tripropylamine, tributylamine, butyldimethylamine, phenyldiethylamine, and the like, or a combination comprising at least one of the foregoing.

Suitable alkylenediamines include those having the formula:

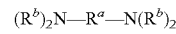

wherein $R^a$ is a substituted or unsubstituted divalent residue; and each $R^b$ is independently hydrogen or $C_{1-8}$ alkyl. In some examples, of the above formula, two or three aliphatic carbon atoms form the closest link between the two diamine nitrogen atoms. Specific alkylenediamine ligands include those in which $R^a$ is dimethylene (—CH$_2$CH$_2$—) or trimethylene (—CH$_2$CH$_2$CH$_2$—). $R^b$ can be independently hydrogen, methyl, propyl, isopropyl, butyl, or a C$_4$-8 alpha-tertiary alkyl group. Examples of alkylenediamine ligands include N,N,N',N' tetramethylethylene diamine (TMED), N,N'-di-tert-butylethylenediamine (DBEDA), N,N,N',N'-tetramethyl-1,3-diaminopropane (TMPD), N-methyl-1,3-diaminopropane, N,N'-dimethyl-1,3-diaminopropane, N,N,N'-dimethyl-1,3-diaminopropane, N-ethyl-1,3-diaminopropane, N-methyl-1,4-diaminobutane, N,N'-trimethyl-1,4-diaminobutane, N,N,N'-trimethyl-1,4-diaminobutane, N,N,N',N'-tetramethyl-1,4-diaminobutane, N,N,N',N'-tetramethyl-1,5-diaminopentane, or a combination comprising at least one of the foregoing. In some embodiments, the amine ligand is di-n-butylamine (DBA), N,N-dimethylbutylamine (DMBA), N,N'-di-tert-butylethylenediamine (DBEDA), or a combination comprising at least one of the foregoing. The catalyst can be prepared in situ by mixing a metal ion source (e.g., cuprous oxide and hydrobromic acid) and amine ligands. In some embodiments, the polymerization catalyst comprises copper ion, bromide ion, and N,N'-di-tert-butylethylenediamine.

As disclosed above, the phenylene ether oligomer is a functional phenylene ether oligomer having particular end groups, and the method of making the functionalized phenylene ether oligomer further comprises reacting the phenylene ether oligomer (e.g., the hydroxyl-terminated phenylene ether oligomer) with a compound comprising unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, or an allylhydroxypropyl to provide the functional phenylene ether oligomer. For example, when a functional phenylene ether having at least one vinyl benzyl ether end group is desired, the method can comprise reacting the hydroxyl-terminated phenylene ether oligomer with a vinyl benzyl halide (e.g., vinyl benzyl chloride). When a functional phenylene ether having at least one (meth)acrylic end group is desired, the method can comprise reacting the hydroxyl-terminated phenylene ether oligomer with a (meth)acrylic acid halide or a (meth)acrylic anhydride. Suitable compounds comprising the desired functional groups and a group reactive toward the hydroxyl-terminated phenylene ether oligomer can be readily determined by one skilled in the art.

The functionalized phenylene ether oligomer of the present disclosure is well suited for use as a reactive component in curable compositions. Thus a curable composition represents another aspect of the present disclosure. The curable composition comprises the functionalized phenylene ether oligomer and a curing promoter.

In some embodiments, the curable composition can further include an auxiliary curable resin, a curable unsaturated monomer composition, or both. The auxiliary curable resin can be a thermoset resin, for example, an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof.

Epoxy resins useful as thermoset resins can be produced by reaction of phenols or polyphenols with epichlorohydrin to form polyglycidyl ethers. Examples of useful phenols for production of epoxy resins include substituted bisphenol A, bisphenol F, hydroquinone, resorcinol, tris-(4-hydroxyphenyl)methane, and novolac resins derived from phenol or o-cresol. Epoxy resins can also be produced by reaction of aromatic amines, such as p-aminophenol or methylenedianiline, with epichlorohydrin to form polyglycidyl amines. Epoxy resins can be converted into solid, infusible, and insoluble three dimensional networks by curing with cross-linkers, often called curing agents, or hardeners. Curing agents are either catalytic or coreactive. Coreactive curing agents have active hydrogen atoms that can react with epoxy groups of the epoxy resin to form a cross-linked resin. The active hydrogen atoms can be present in functional groups comprising primary or secondary amines, phenols, thiols, carboxylic acids, or carboxylic acid anhydrides. Examples of coreactive curing agents for epoxy resins include aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, or a combination comprising at least one of the foregoing coreactive curing agents. A catalytic curing agent functions as an initiator for epoxy resin homopolymerization or as an accelerator for coreactive curing agents. Examples of catalytic curing agents include tertiary amines, such as 2-ethyl-4-methylimidazole, Lewis acids, such as boron trifluoride, and latent cationic cure catalysts, such as diaryliodonium salts.

The thermoset resin can be a cyanate ester. Cyanate esters are compounds having a cyanate group (—O—C≡N) bonded to carbon via the oxygen atom, i.e. compounds with C—O—C≡N groups. Cyanate esters useful as thermoset resins can be produced by reaction of a cyanogen halide with a phenol or substituted phenol. Examples of useful phenols include bisphenols utilized in the production of epoxy resins, such as bisphenol A, bisphenol F, and novolac resins based on phenol or o-cresol. Cyanate ester prepolymers are prepared by polymerization/cyclotrimerization of cyanate esters. Prepolymers prepared from cyanate esters and diamines can also be used.

The thermoset resin can be a bismaleimide. Bismaleimide resins can be produced by reaction of a monomeric bismaleimide with a nucleophile such as a diamine, aminophenol, or amino benzhydrazide, or by reaction of a bismaleimide with diallyl bisphenol A. Specific examples of bismaleimide resins can include 1,2-bismaleimidoethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimidodiphenylether, 3,3'-bismaleimidodiphenylsulfone, 4,4'-bismaleimidodiphenylsulfone, 4,4'-bismaleimidodicyclohexylmethane, 3,5-bis(4-maleimidophenyl)pyridine, 2,6-bismaleimidopyridine, 1,3-bis(maleimidomethyl)cyclohexane, 1,3-bis(maleimidomethyl)benzene, 1,1-bis(4-maleimidophenyl)cyclohexane, 1,3-bis(dichloromaleimido)benzene, 4,4'-bis(citraconimido)diphenylmethane, 2,2-bis(4-maleimidophenyl)propane, 1-phenyl-1,1-bis(4-maleimidophenyl)ethane, N,N-bis(4-maleimidophenyl)toluene, 3,5-bismaleimido-1,2,4-triazole N,N'-ethylenebismaleimide, N,N'-hexamethylenebismaleimide, N,N'-m-phenylenebismaleimide, N,N'-p-phenylenebismaleimide, N,N'-4,4'-diphenylmethanebismaleimide, N,N'-4,4'-diphenyletherbismaleimide, N,N'-4,4'-diphenylsufonebismaleimide, N,N'-4,4'-dicyclohexylmethanebismaleimide, N,N'-.alpha,alpha'-4,4'-dimethylenecyclohexanebismaleimide, N,N'-m-methaxylenebismaleimide, N,N'-4,4'-diphenylcyclohexanebismaleimide, and N,N'-methylenebis(3- chloro-p-phenylene)bismaleimide, as well as the maleimide resins disclosed in U.S. Pat. No. 3,562,223 to Bargain et al., and U.S. Pat. Nos. 4,211,860 and 4,211,861 to Stenzenberger. Bismaleimide resins can be prepared by methods known in the art, as described, for example, in U.S. Pat. No. 3,018,290 to Sauters et al. In some embodiments, the bismaleimide resin is N,N'-4,4'-diphenylmethane bismaleimide.

The thermoset resin can be a benzoxazine resin. As is well known, benzoxazine monomers are made from the reaction of three reactants, aldehydes, phenols, and primary amines with or without solvent. U.S. Pat. No. 5,543,516 to Ishida describes a solventless method of forming benzoxazine monomers. An article by Ning and Ishida in *Journal of Polymer Science, Chemistry Edition*, vol. 32, page 1121 (1994) describes a procedure using a solvent. The procedure using solvent is generally common to the literature of benzoxazine monomers.

The preferred phenolic compounds for forming benzoxazines include phenols and polyphenols. The use of polyphenols with two or more hydroxyl groups reactive in forming benzoxazines can result in branched or crosslinked products. The groups connecting the phenolic groups into a phenol can be branch points or connecting groups in the polybenzoxazine.

Suitable phenols for use in the preparation of benzoxazine monomers include phenol, cresol, resorcinol, catechol, hydroquinone, 2-allylphenol, 3-allylphenol, 4-allylphenol, 2,6-dihydroxynaphthalene, 2,7-dihydroxynapthalene, 2-(diphenylphosphoryl)hydroquinone, 2,2'-biphenol, 4,4-biphenol, 4,4'-isopropylidenediphenol (bisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol (bisphenol E), 4,4'oxydiphenol, 4,4'thiodiphenol, 4,4'-sufonyldiphenol, 4,4'sulfinyldiphenol, 4,4'-hexafluoroisoproylidene)bisphenol (Bisphenol AF), 4,4' (1-phenylethylidene)bisphenol (Bisphenol AP), bis(4-hydroxyphenyl)-2,2-dichloroethylene (Bisphenol C), Bis(4-hydroxyphenyl)methane (Bisphenol-F), 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, isopropylidenebis(2-allylphenol), 3,3-bis(4-hydroxyphenyl)isobenzofuran-1 (3H)-one, 1-(4-hydroxyphenyl)-3,3-dimethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tetrakis(4-hydroxyphenyl)ethane dicyclopentadienylbis(2,6-dimethyl phenol), dicyclopentadienyl bis(ortho-cresol), dicyclopentadienyl bisphenol, and the like.

The aldehydes used to form the benzoxazine can be any aldehyde. In some embodiments, the aldehyde has 1-10 carbon atoms. In some embodiments, the aldehyde is formaldehyde. The amine used to form the benzoxazine can be an aromatic amine, an aliphatic amine, an alkyl substituted aromatic, or an aromatic substituted alkyl amine. The amine can also be a polyamine, although the use of polyamines will, under some circumstances, yield polyfunctional benzoxazine monomers. Polyfunctional benzoxazine monomers are more likely to result in branched and/or crosslinked polybenzoxazines than monofunctional benzoxazines, which would be anticipated to yield thermoplastic polybenzoxazines.

The amines for forming benzoxazines generally have 1-40 carbon atoms unless they include aromatic rings, and then they can have 6-40 carbon atoms. The amine of di- or polyfunctional can also serve as a branch point to connect one polybenzoxazine to another. Thermal polymerization has been the preferred method for polymerizing benzoxazine monomers. The temperature to induce thermal polymerization is typically varied from 150-300° C. The polymerization is typically done in bulk, but could be done from solution or otherwise. Catalysts, such as carboxylic acids, have been known to slightly lower the polymerization temperature or accelerate the polymerization rate at the same temperature.

The thermoset resin can be a vinylbenzyl ether resin. Vinyl benzyl ether resins can be most readily prepared from condensation of a phenol with a vinyl benzyl halide, such as vinylbenzyl chloride to produce a vinylbenzyl ether. Bisphenol-A and trisphenols and polyphenols are generally used to produce poly(vinylbenzyl ethers) which can be used to produce crosslinked thermosetting resins. Vinyl benzyl ethers useful in the present composition can include those vinylbenzyl ethers produced from reaction of vinylbenzyl chloride or vinylbenzyl bromide with resorcinol, catechol, hydroquinone, 2,6-dihydroxy naphthalene, 2,7-dihydroxynapthalene, 2-(diphenylphosphoryl)hydroquinone, bis (2,6-dimethylphenol) 2,2'-biphenol, 4,4-biphenol, 2,2',6,6'-tetramethylbiphenol, 2,2',3,3',6,6'-hexamethylbiphenol, 3,3', 5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol (bisphenol E), 4,4' oxydiphenol, 4,4'thiodiphenol, 4,4'thiobis(2,6-dimethylphenol), 4,4'-sufonyldiphenol, 4,4'-sufonylbis(2,6-dimethylphenol) 4,4'sulfonyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2, 6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1] heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis (2,6-dimethyl phenol), dicyclopentadienyl bis(ortho-cresol), dicyclopentadienyl bisphenol, and the like.

The thermoset resin can be an arylcyclobutene resin. Arylcyclobutenes include those derived from compounds of the general structure

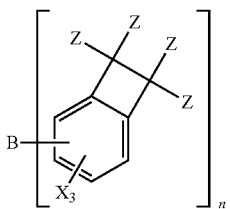

wherein B is an organic or inorganic radical of valence n (including carbonyl, sulfonyl, sulfinyl, sulfide, oxy, alkylphosphonyl, arylphosphonyl, isoalkylidene, cycloalkylidene, arylalkylidene, diarylmethylidene, methylidene dialkylsilanyl, arylalkylsilanyl, diarylsilanyl and $C_{6-20}$ phenolic compounds); each occurrence of X is independently hydroxy or $C_{1-24}$ hydrocarbyl (including linear and branched alkyl and cycloalkyl); and each occurrence of Z is independently hydrogen, halogen, or $C_{1-12}$ hydrocarbyl; and n is 1-1000, or 1-8, or 2, 3, or 4. Other useful arylcyclobutenes and methods of arylcyclobutene synthesis can be found in U.S. Pat. Nos. 4,743,399, 4,540,763, 4,642,329, 4,661,193, and 4,724,260 to Kirchhoff et al., and U.S. Pat. No. 5,391,650 to Brennan et al.

The thermoset resin can be a perfluorovinyl ether resin. Perfluorovinyl ethers are typically synthesized from phenols and bromotetrafluoroethane followed by zinc catalyzed reductive elimination producing ZnFBr and the desired perfluorovinylether. By this route bis, tris, and other polyphenols can produce bis-, tris- and poly(perfluorovinylether) s. Phenols useful in their synthesis include resorcinol, catechol, hydroquinone, 2,6-dihydroxy naphthalene, 2,7-dihydroxynapthalene, 2-(diphenylphosphoryl) hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol (bisphenol E), 4,4' oxydiphenol, 4,4'thiodiphenol, 4,4'thiobis(2,6-dimethylphenol), 4,4'-sufonyldiphenol, 4,4'-sufonylbis(2,6-dimethylphenol) 4,4'sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1] heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis (2,6-dimethyl phenol), dicyclopentadienyl bis(2-methylphenol), dicyclopentadienyl bisphenol, and the like.

The thermoset resin can be an oligomer or polymer with curable vinyl functionality. Such materials include oligomers and polymers having crosslinkable unsaturation. Examples include styrene butadiene rubber (SBR), butadiene rubber (BR), and nitrile butadiene rubber (NBR) having unsaturated bonding based on butadiene; natural rubber (NR), isoprene rubber (IR), chloroprene rubber (CR), butyl rubber (a copolymer of isobutylene and isoprene, IIR), and halogenated butyl rubber having unsaturated bonding based on isoprene; ethylene-α-olefin copolymer elastomers having unsaturated bonding based on dicyclopentadiene (DCPD), ethylidene norbornene (ENB), or 1,4-dihexadiene (1,4-HD) (namely, ethylene-α-olefin copolymers obtained by copolymerizing ethylene, an α-olefin, and a diene, such as ethylene-propylene-diene terpolymer (EPDM) and ethylene-butene-diene terpolymer (EBDM). In some embodiments, an EBDM is used. Examples also include hydrogenated nitrile rubber, fluorocarbon rubbers such as vinylidenefluoride-hexafluoropropene copolymer and vinylidenefluoride-pentafluoropropene copolymer, epichlorohydrin homopolymer (CO), copolymer rubber (ECO) prepared from epichlorohydrin and ethylene oxide, epichlorohydrin allyl glycidyl copolymer, propylene oxide allyl glycidyl ether copolymer, propylene oxide epichlorohydrin allyl glycidyl ether terpolymer, acrylic rubber (ACM), urethane rubber (U), silicone rubber (Q), chlorosulfonated polyethylene rubber (CSM), polysulfide rubber (T) and ethylene acrylic rubber. Further examples include various liquid rubbers, for example various types of liquid butadiene rubbers, and the liquid atactic butadiene rubber that is butadiene polymer with 1,2-vinyl connection prepared by anionic living polymerization. It is also possible to use liquid styrene butadiene rubber, liquid nitrile butadiene rubber (CTBN, VTBN, ATBN, etc. by Ube Industries, Ltd.), liquid chloroprene rubber, liquid polyisoprene, dicyclopentadiene type hydrocarbon polymer, and polynorbornene (for example, as sold by Elf Atochem).

Polybutadiene resins, generally polybutadienes containing high levels of 1,2 addition are desirable for thermosetting matrices. Examples include the functionalized polybutadienes and poly(butadiene-styrene) random copolymers sold by Ricon Resins, Inc. under the trade names RICON, RICACRYL, and RICOBOND resins. These include butadienes containing both low vinyl content such as RICON 130, 131, 134, 142; polybutadienes containing high vinyl content such as RICON 150, 152, 153, 154, 156, 157, and P30D; random copolymers of styrene and butadiene including RICON 100, 181, 184, and maleic anhydride grafted polybutadienes and the alcohol condensates derived therefrom such as RICON 130MA8, RICON MA13, RICON 130MA20, RICON 131MAS, RICON 131MA10, RICON MA17, RICON MA20, RICON 184MA6 and RICON 156MA17. Also included are polybutadienes that can be used to improve adhesion including RICOBOND 1031, RICOBOND 1731, RICOBOND 2031, RICACRYL 3500, RICOBOND 1756, RICACRYL 3500; the polybutadienes RICON 104 (25% polybutadiene in heptane), RICON 257 (35% polybutadiene in styrene), and RICON 257 (35% polybutadiene in styrene); (meth)acrylic functionalized polybutadienes such as polybutadiene diacrylates and polybutadiene dimethacrylates. These materials are sold under the tradenames RICACRYL 3100, RICACRYL 3500, and RICACRYL 3801. Also are included are powder dispersions of functional polybutadiene derivatives including, for example, RICON 150D, 152D, 153D, 154D, P30D, RICOBOND 0 1731 HS, and RICOBOND 1756HS. Further butadiene resins include poly(butadiene-isoprene) block and random copolymers, such as those with molecular weights from 3,000-50,000 grams per mole and polybutadiene homopolymers having molecular weights from 3,000-50,000 grams per mole. Also included are polybutadiene, polyisoprene, and polybutadiene-isoprene copolymers functionalized with maleic anhydride functions, 2-hydroxyethylmaleic functions, or hydroxylated functionality.

Further examples of oligomers and polymers with curable vinyl functionality include unsaturated polyester resins based on maleic anhydride, fumaric acid, itaconic acid and citraconic acid; unsaturated epoxy (meth)acrylate resins containing acryloyl groups, or methacryloyl group; unsaturated epoxy resins containing vinyl or allyl groups, urethane (meth)acrylate resin, polyether (meth)acrylate resin, polyalcohol (meth)acrylate resins, alkyd acrylate resin, polyester acrylate resin, spiroacetal acrylate resin, diallyl phthalate resin, diallyl tetrabromophthalate resin, diethyleneglycol bisallylcarbonate resin, and polyethylene polythiol resin.

Combinations of any one or more of the foregoing thermoset resins can be used as the auxiliary resin when present in the curable composition.

In some embodiments, the curable composition comprises the curable unsaturated monomer composition. The curable unsaturated monomer composition can include, for example, a monofunctional styrenic compound (e.g., styrene), a monofunctional (meth)acrylic compound, a polyfunctional allylic compound, a polyfunctional (meth)acrylate, a polyfunctional (meth)acrylamide, a polyfunctional styrenic compound, or a combination thereof. For example, in some embodiments, the curable unsaturated monomer composition can be an alkene-containing monomer or an alkyne-containing monomer. Suitable alkene- and alkyne-containing monomers includes those described in U.S. Pat. No. 6,627,704 to Yeager et al. Suitable alkene-containing monomers include acrylate, methacrylate, and vinyl ester functionalized materials capable of undergoing free radical polymerization. Of particular use are acrylate and methacrylate materials. They can be monomers and/or oligomers such as (meth)acrylates, (meth)acrylamides, N-vinylpyrrolidone and vinylazlactones as disclosed in U.S. Pat. No. 4,304,705 of Heilman et al. Such monomers include mono-, di-, and polyacrylates and methacrylates, such as methyl acrylate, methyl methacrylate, ethyl acrylate, isopropyl methacrylate, isooctyl acrylate, isobornyl acrylate, isobornyl methacrylate, acrylic acid, n-hexyl acrylate, tetrahydrofurfuryl acrylate, N-vinylcaprolactam, N-vinylpyrrolidone, acrylonitrile, stearyl acrylate, allyl acrylate, glycerol diacrylate, glycerol triacrylate, ethylene glycol diacrylate, diethylene glycol diacrylate, triethylene glycol dimethacrylate, 1,6-hexanediol diacrylate, 1,3-propanediol diacrylate, 1,3-propanediol dimethacrylate, trimethylolpropane triacrylate, 1,2,4-butanetriol trimethacrylate, 2-phenoxyethyl acrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyldimethylmethane, 2,2-bis[1-(3-acryloxy-2-hydroxy)]propoxyphenylpropane, tris(hydroxyethyl)isocyanurate trimethacrylate; the bis-acrylates and bis-methacrylates of polyethylene glycols of molecular weight average 200-500 grams per mole, bis-acrylates and bis-methacrylates of polybutadienes of molecular weight average 1000-10,000 grams per mole, copolymerizable mixtures of acrylated monomers such as those disclosed in U.S. Pat. No. 4,652,274 to Boettcher et al. and acrylated oligomers such as those disclosed in U.S. Pat. No. 4,642,126 to Zador et al.

It can be desirable to crosslink the alkene- or alkyne-containing monomer. Particularly useful as crosslinker compounds are acrylates such as allyl acrylate, glycerol diacrylate, glycerol triacrylate, ethylene glycol diacrylate, diethylene glycol diacrylate, triethylene glycol dimethacrylate, 1,6-hexanediol diacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyldimethylmethane, 2,2-bis[1-(3-acryloxy-2-hydroxy)]propoxyphenylpropane, tris(hydroxyethyl)isocyanurate trimethacrylate; and the bis-acrylates and bis-methacrylates of polyethylene glycols of average molecular weight 200-500 grams per mole.

Also included are allylic resins and styrenic resins for example triallylisocyanurate and trimethallylisocyanurate, trimethallylcyanurate, triallylcyanurate, divinyl benzene and dibromostyrene and others described in U.S. Pat. No. 6,627,704 to Yeager et al.

A suitable curing promoter can be selected based on the functional group present on the phenylene ether oligomer and, when present, the auxiliary curable resin or the curable unsaturated monomer composition. For example, the curing promoter can comprise an amine, a dicyandiamide, a polyamide, an amidoamine, a Mannich base, an anhydride, a phenol-formaldehyde resin, a carboxylic acid functional polyester, a polysulfide, a polymercaptan, an isocyanate, a cyanate ester, or a combination comprising at least one of the foregoing.

In addition to the phenylene ether oligomer, the curing promoter, and, when present, the auxiliary resin or unsaturated monomer composition, the curable composition can, optionally, comprise a solvent. The solvent can have an atmospheric boiling point of 50 to 250° C. A boiling point in this range facilitates removal of solvent from the curable composition while minimizing or eliminating the effects of bubbling during solvent removal.

The solvent can be, for example, a $C_{3-8}$ ketone, a $C_{3-8}$ N,N-dialkylamide, a $C_{4-16}$ dialkyl ether, a $C_{6-12}$ aromatic hydrocarbon, a $C_{1-3}$ chlorinated hydrocarbon, a $C_{3-6}$ alkyl alkanoate, a $C_{2-6}$ alkyl cyanide, or a combination thereof. The carbon number ranges refer to the total number of carbon atoms in the solvent molecule. For example, a $C_{4-16}$ dialkyl ether has 4 to 16 total carbon atoms, and the two alkyl groups can be the same or different. As other examples, the 3-8 carbon atoms in the "N,N-dialkylamide" include the carbon atom in the amide group, and the 2-6 carbons in the "$C_{2-6}$ alkyl cyanides" include the carbon atom in the cyanide group. Specific ketone solvents include, for example, acetone, methyl ethyl ketone, methyl isobutyl ketone, or a combination comprising at least one of the foregoing. Specific $C_{4-8}$ N,N-dialkylamide solvents include, for example, dimethylformamide, dimethylacetamide, N-methyl-2-pyrrolidone (Chemical Abstracts Service Registry No. 872-50-4), or a combination comprising at least one of the foregoing. Specific dialkyl ether solvents include, for example, tetrahydrofuran, ethylene glycol monomethylether, dioxane, or a combination comprising at least one of the foregoing. In some embodiments, the $C_{4-16}$ dialkyl ethers include cyclic ethers such as tetrahydrofuran and dioxane. In some embodiments, the $C_{4-16}$ dialkyl ethers are noncyclic. The dialkyl ether can, optionally, further include one or more ether oxygen atoms within the alkyl groups and one or more hydroxy group substituents on the alkyl groups. The aromatic hydrocarbon solvent can comprise an ethylenically unsaturated solvent. Specific aromatic hydrocarbon solvents include, for example, benzene, toluene, xylenes, styrene, divinylbenzenes, or a combination comprising at least one of the foregoing. The aromatic hydrocarbon solvent is preferably non-halogenated. That is, it does not include any fluorine, chlorine, bromine, or iodine atoms. Specific $C_{3-6}$ alkyl alkanoates include, for example, methyl acetate, ethyl acetate, methyl propionate, ethyl propionate, or a combination comprising at least one of the foregoing. Specific $C_{2-6}$ alkyl cyanides include, for example, acetonitrile, propionitrile, butyronitrile, or a combination comprising at least one of the foregoing. In some embodiments, the solvent is acetone. In some embodiments, the solvent is methyl ethyl ketone. In some embodiments, the solvent is methyl isobutyl ketone. In some embodiments, the solvent is N-methyl-2-pyrrolidone. In some embodiments, the solvent is dimethylformamide. In some embodiments, the solvent is ethylene glycol monomethyl ether.

When a solvent is utilized, the curable composition can comprise 2-100 parts by weight of the solvent, based on 100 parts by weight total of the phenylene ether oligomer, the curing promoter, and the auxiliary resin or unsaturated monomer composition (when present). For example, the solvent amount can be 5-80 parts by weight, or 10-60 parts by weight, or 20-40 parts by weight, based on 100 parts by weight total of the phenylene ether oligomer, the curing promoter, and any auxiliary resin. The solvent can be chosen, in part, to adjust the viscosity of the curable composition. Thus, the solvent amount can depend on variables including the type and amount of phenylene ether oligomer, the type and amount of curing promoter, the type and amount of auxiliary resin, and the processing temperature used for any subsequent processing of the curable composition, for example, impregnation of a reinforcing structure with the curable composition for the preparation of a composite.

The curable composition can further comprise an inorganic filler. Suitable inorganic fillers include, for example, alumina, silica (including fused silica and crystalline silica), boron nitride (including spherical boron nitride), aluminum nitride, silicon nitride, magnesia, magnesium silicate, glass fibers, glass mat, or a combination comprising at least one of the foregoing. Suitable glass fibers include those based on E, A, C, ECR, R, S, D, and NE glasses, as well as quartz. The glass fiber can have a diameter of 2-30 micrometers, or 5-25 micrometers, or 5-15 micrometers. The length of the glass fibers before compounding can be 2-7 millimeters, or 1.5-5 millimeters. Alternatively, longer glass fibers or continuous glass fibers can be used. The glass fiber can, optionally, include an adhesion promoter to improve its compatibility with the poly(arylene ether), the auxiliary epoxy resin, or both. Adhesion promoters include chromium complexes, silanes, titanates, zircon-aluminates, propylene maleic anhydride copolymers, reactive cellulose esters, and the like. Suitable glass fiber is commercially available from suppliers including, for example, Owens Corning, Nippon Electric Glass, PPG, and Johns Manville.

When an inorganic filler is utilized, the curable composition can comprise 2-900 parts by weight of inorganic filler, based on 100 parts by weight total of the poly(arylene ether), the curing promoter, and the auxiliary epoxy resin. In some embodiments, the curable composition comprises 100-900 parts by weight inorganic filler, or 200-800 parts by weight inorganic filler, or 300-700 parts by weight inorganic filler, based on 100 parts by weight total poly(arylene ether), curing promoter, and auxiliary epoxy resin. In some embodiments, the curable composition comprises less than 50 parts by weight inorganic filler, or less than 30 parts by weight inorganic filler, or less than 10 parts by weight inorganic filler, based of 100 parts by weight total of the poly(arylene ether), the curing promoter, and the auxiliary epoxy resin. In some embodiments, the curable composition can be substantially free of inorganic filler (that is, the composition can comprises less than 0.1 weight percent of added inorganic filler, based 100 parts by weight of the poly(arylene ether), the curing promoter, and the auxiliary epoxy resin).

The curable composition can, optionally, further comprise one or more additives. Suitable additives include, for example, solvents, dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, or a combination comprising at least one of the foregoing.

The curable composition can comprise the phenylene ether oligomer described herein, a curing promoter, a solvent, and an auxiliary resin. In some embodiments, the composition is free of coreactive curing agent other than the phenylene ether oligomer.

The curable composition can comprise 1-99 weight percent of the auxiliary curable resin, a curable unsaturated monomer composition, or both and 1-99 weight percent of the phenylene ether oligomer, based on the total weight of the curable composition. For example, the composition can include 20-99 weight percent of the auxiliary curable resin, a curable unsaturated monomer composition, or both and 1-80 weight percent of the phenylene ether oligomer.

A cured composition (also referred to as a thermoset composition) is obtained by heating the curable composition defined herein for a time and temperature sufficient to evaporate the solvent and effect curing. For example, the curable composition can be heated to a temperature of 50-250° C. to cure the composition and provide the thermoset composition. The cured composition can also be referred to as a thermoset composition. In curing, a cross-linked, three-dimensional polymer network is formed. For certain thermoset resins, for example (meth)acrylate resins, curing can also take place by irradiation with actinic radiation at a sufficient wavelength and time. In some embodiments, curing the composition can include injecting the curable composition into a mold, and curing the injected composition at 150-250° C. in the mold.

The thermoset composition can have one or more desirable properties. For example, the thermoset composition can have a glass transition temperature of greater than or equal to 180° C., preferably greater than or equal to 190° C., more preferably greater than or equal to 200° C.

The curable composition described herein can also be particularly well suited for use in forming various articles. For example, useful articles can be in the form of a composite, a foam, a fiber, a layer, a coating, an encapsulant, an adhesive, a sealant, a molded component, a prepreg, a casing, a laminate, a metal clad laminate, an electronic composite, a structural composite, or a combination comprising at least one of the foregoing. In some embodiments, the article can be in the form of a composite that can be used in a variety of application, for example printed circuit boards.

Accordingly, the present inventors have identified a new phenylene ether oligomer including a trisubstituted resorcinol moiety which can be particularly well suited for use in a variety of applications.

The present disclosure is further illustrated by the following non-limiting examples.

Preparative Example 1

This example describes the preparation of 2,4,6-trimethylresorcinol, using the components summarized in Table 1.

TABLE 1

| Component | Description |
| --- | --- |
| Methanol | Methanol, CAS Reg. No. 67-56-1, having a purity of at least 99.8 percent; obtained from Sigma-Aldrich. |
| Resorcinol | Resorcinol, CAS Reg. No. 108-46-3, having a purity at least 99.0 percent. |
| Water | Water, CAS Reg. No. 7732-18-5, having a purity of at least 99.9%, was obtained as deionized water. |
| MgO | Magnesium oxide, CAS Reg. No. 1309-48-4, having a purity of at least 93%, was obtained from Dead Sea Periclase Ltd. |
| PEG | Polyethylene glycol, CAS Reg. No. 25322-68-3, having a nominal purity of 100% and a number average molecular weight of 400 grams/mole, was obtained from Spectrum Fine Chemicals. |
| HPMAS | (Highly Purified Magnesium Aluminosilicate) Hydrous magnesium aluminosilicate, CAS Reg. No. 12174-11-7, having a purity of about 93 to 95 weight percent, obtained as ACTI-GEL ™ 208 from ActiveMinerals International LLC. |
| $Cu(NO_3)_2 \cdot 3H_2O$ | Copper (II) nitrate trihydrate, CAS Reg. No. 10031-43-3, having a purity of at least 99.5%, was obtained from Strem Chemicals. |
| Graphite | Graphite, CAS Reg. No. 7782-42-5, nominally 100% pure, was obtained as graphite from Asbury Carbon. |

A catalyst precursor was prepared using the formulation summarized in Table 2, where component amounts are expressed in parts by weight. To 85.5 grams of magnesium oxide, 4.3 grams of PEG, 4.3 grams of HPMAS, 0.9 grams of $Cu(NO_3)_2.3H_2O$ and 0.9 gram of graphite were added and thoroughly mixed. To the resulting powder mix, 4.3 grams of water was added dropwise and dispersed by mixing. The powder mixture was pressed into 4.76 millimeters (3/16 inch) diameter pellets using a die press. The pellets were used as the catalyst precursor.

TABLE 2

| Component | Amount (pbw) |
| --- | --- |
| MgO | 85.5 |
| PEG | 4.3 |
| HPMAS | 4.3 |
| Water | 4.3 |
| $Cu(NO_3)_2 \cdot 3H_2O$ | 0.9 |
| Graphite | 0.9 |
| MgSt | 0.0 |

The vapor phase methylation reaction between resorcinol and methanol was conducted in a continuous packed bed reactor. The reactor is a stainless steel tube having a 12.7 millimeter (0.5 inch) inner diameter. The reactor is heated using an electric furnace.

Five (5) grams of the catalyst precursor was packed at the center of the reactor tube. Further, the catalyst bed was supported with glass beads. The catalyst precursor was calcined at 390° C. for 22 hours under nitrogen at a weight hourly space velocity (WHSV) of 0.11 hour$^{-1}$ with no back-pressure in the system. After 22 hours of calcination, the reactor temperature was raised at a rate of 0.5° C./minute to 460° C. Before the reactant feed was pumped to the reactor, the reactor pressure was increased to 270 kilopascals absolute pressure (1.7 bar gauge), and that pressure was maintained throughout the reaction time. The feed to the reactor was a homogenous solution of resorcinol and methanol (1:8 molar ratio) and water (20% of total weight). The liquid feed was pumped into the reactor using a high performance liquid chromatography (HPLC) pump at a flow rate of 0.2 millimeters/minute. As the reactor temperature was very high (350-450° C.), the liquid feed that enters into the reactor vaporizes before it encounters the catalyst. The alkylation reactions occurred in the catalyst bed, and all the gaseous material exiting the reactor passed through a condenser to form a mixture of liquid products and non-condensable gases. This mixture of liquid products and non-condensable gases was separated in a gas-liquid separator. Analysis of the unpurified reaction mixture indicated 65% conversion of resorcinol with a 62% selectivity for MTR.

To purify the MTR in the reaction mixture (mixture of liquid products), one weight part of the liquid products was washed with 2 weight parts water. This procedure was repeated two more times and removed most of the unreacted resorcinol and methanol. The product was concentrated further to produce a viscous liquid to which ten volume parts hexane were added to produce a precipitate, and the resulting liquid/solid mixture was stirred for 30 minutes at 50° C. The powder was filtered and washed 2 times with hexane to yield a crude product with 2,4,6-trimethylresorcinol of 85 weight percent purity, the primary contaminants being dimethyl resorcinols and monomethyl resorcinols. The product was further purified by crystallization as follows.

Ten (10) grams of the crude product having 85% purity was dissolved in a minimum amount of acetone (5 to 10 milliliters), and water was added slowly until turbidity was observed. The resulting mixture was stirred, then heated to dissolve the turbid particles. The mixture was filtered, and the filtrate was aside for two to three hours, during which time crystals formed. The crystals were filtered, washed with 20 milliliters of water, and dried at room temperature. The final product, 2,4,6-trimethylresorcinol, was characterized by gas chromatography, gas chromatography-mass spectrometry, and proton nuclear magnetic resonance spectroscopy. The product had a purity of 99.3 weight percent.

Preparative Example 2

This example describes the copolymerization of 2,4,6-trimethyl resorcinol (TMR) and 2,6-xylenol. Components used in the copolymerization are summarized in Table 3.

TABLE 3

| Component | Description |
|---|---|
| Toluene | Toluene, CAS Reg. No. 108-88-3, having a purity of at least 99.8 percent, was obtained from Sigma-Aldrich. |
| 2,6-Xylenol | 2,6-Xylenol, CAS Reg. No. 576-26-1, having a purity of at least 99 percent, was obtained from Sigma-Aldrich. |
| TMR | 2,4,6-Trimethylresorcinol, CAS Reg. No. 608-98-0, having a purity of 99.3 percent, prepared as described in Preparative Example 1. |
| $Cu_2O$ | Cuprous oxide, CAS Reg. No. 1317-39-1, having a purity of at least 97 percent, was obtained from Sigma-Aldrich |
| HBr | Hydrobromic acid, CAS Reg. No. 10035-10-6, was obtained as a 48% aqueous solution from S D Fine-Chem Limited. |
| DBEDA | N,N'-di-tert-butylethylenediamine, CAS Reg. No. 4062-60-6, having a purity of at least 98 percent, was obtained from Sigma-Aldrich. |
| DBA | Di-n-butylamine, CAS Reg. No. 111-92-2, having a purity of at least 98 percent was obtained from Sigma-Aldrich. |
| DMBA | N,N-Dimethylbutylamine, CAS Reg. No. 927-62-8, having a purity of at least 98 percent, obtained from Sigma-Aldrich. |
| DADMAC | N,N,N'N'-Didecyldimethyl ammonium chloride, CAS Reg. No. 7173-51-5, having a purity of at least 98 percent, obtained from Sigma-Aldrich. |
| $Na_3NTA$ | Nitrilotriacetic acid trisodium salt, CAS Reg. No. 5064-31-3, having a purity of at least 98 percent, obtained from Sigma-Aldrich |

To an oxidative coupling reactor equipped with overhead stirrer, air inlet tube, and thermometer was added a reactant mixture comprising toluene (100 milliliters), 2,6-xylenol (9 grams, 73.7 millimoles), 2,4,6-trimethylresorcinol (2 grams, 13.1 millimoles), and a catalyst solution comprising cuprous oxide (16 milligrams, 0.224 millimoles Cu), di-N-butylamine (180 milligrams, 1.39 millimoles), N,N-dimethyl-N-butylamine (580 milligrams, 5.72 millimoles), N,N'-di-tert-butylethylenediamine (30 milligrams, 0.174 millimoles), and hydrobromic acid (92 milligrams of a 48 weight percent aqueous solution, corresponding to 0.455 millimoles bromide ion). The catalyst solution was pre-mixed by dissolving the cuprous oxide, hydrobromic acid solution, and the amines in 10 milliliters toluene.

Air (as an oxygen source) was added in to the vigorously stirred solution. The temperature was maintained at 45° C. during the reaction. The reaction was continued for two hours, over which time the solution became viscous. To terminate the reaction, the air flow was cut off and an aqueous solution of trisodium nitrilotriacetate was added to the reaction mixture. The organic and aqueous layers were separated, and toluene was removed from the organic layer. The solid residue was analyzed by nuclear magnetic resonance spectroscopy (NMR).

As shown in FIG. 1, $^1$H NMR spectroscopy confirmed the structure of the hydroxyl-terminated polymer including the TMR unit as the initiator. The hydroxyl terminated poly(phenylene ether) exhibited an intrinsic viscosity of 0.1285 dL/g, as determined by Ubbelohde viscometer in chloroform.

Example 1

Figure 2:
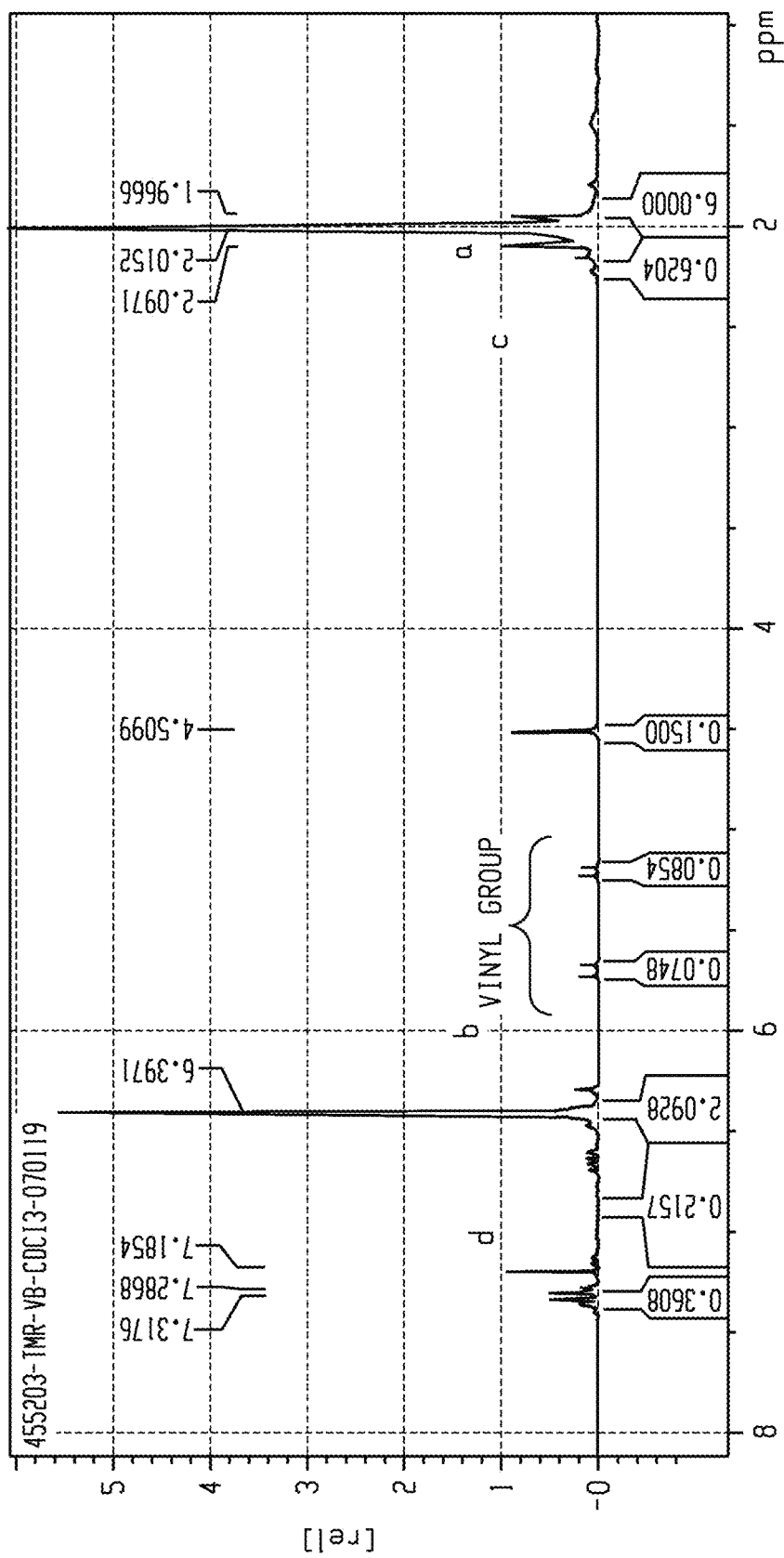
FIG. 2 shows a $^1$H NMR spectrum of a vinyl benzyl ether-terminated poly(phenylene ether) including a trimethylresorcinol unit.

The hydroxyl-terminated poly(phenylene ether) obtained is end-functionalized by reaction of the polymer (5 grams) with vinyl benzyl chloride (0.24 grams) in 10 milliliters of toluene at an initial temperature of 100° C., followed by a ramp up to 120° C., with continuous monitoring of the hydroxyl (OH) concentration, until an OH concentration of less than 150 ppm is reached. The temperature of the reaction mixture is then brought to 85° C. and the reaction is quenched by adding dilute base. The product precipitates using methanol under vigorous stirring, and is then filtered and dried at room temperature and then at 110° C. to provide a vinyl benzyl ether end-capped poly(phenylene ether) having a 2,4,6-trimethylresorcinol unit. The modified poly(phenylene ether) can be characterized by $^1$H NMR spectroscopy and gel permeation chromatography relative to polystyrene standards in chloroform. The structure of the vinyl benzyl ether end-capped poly(phenylene ether) having a 2,4,6-trimethylresorcinol unit was confirmed by $^1$H NMR spectroscopy as shown in FIG. 2. The vinyl benzyl ether end-capped poly(phenylene ether) exhibited an intrinsic viscosity of 0.1565 dL/g, as determined by Ubbelohde viscometer in chloroform.

Example 2

The hydroxyl-terminated poly(phenylene ether) obtained is end-functionalized by reaction of the polymer (5 grams) with methacrylic anhydride (1.3 grams) in 10 milliliters of toluene, and in the presence of N,N-dimethyl acetophenone (0.06 grams) as a catalyst, at an initial temperature of 100° C., followed by a ramp up to 120° C., with continuous monitoring of the hydroxyl (OH) concentration, until an OH concentration of less than 150 ppm is reached. The temperature of the reaction mixture is then brought to 85° C. and the reaction is quenched by adding dilute base. The product precipitates using methanol under vigorous stirring, and is then filtered and dried at room temperature and then at 110° C. to provide a methacrylate end-capped poly(phenylene ether) having a 2,4,6-trimethylresorcinol unit. The modified poly(phenylene ether) can be characterized by $^1$H NMR spectroscopy and gel permeation chromatography relative to polystyrene standards in chloroform.

Figure 3:
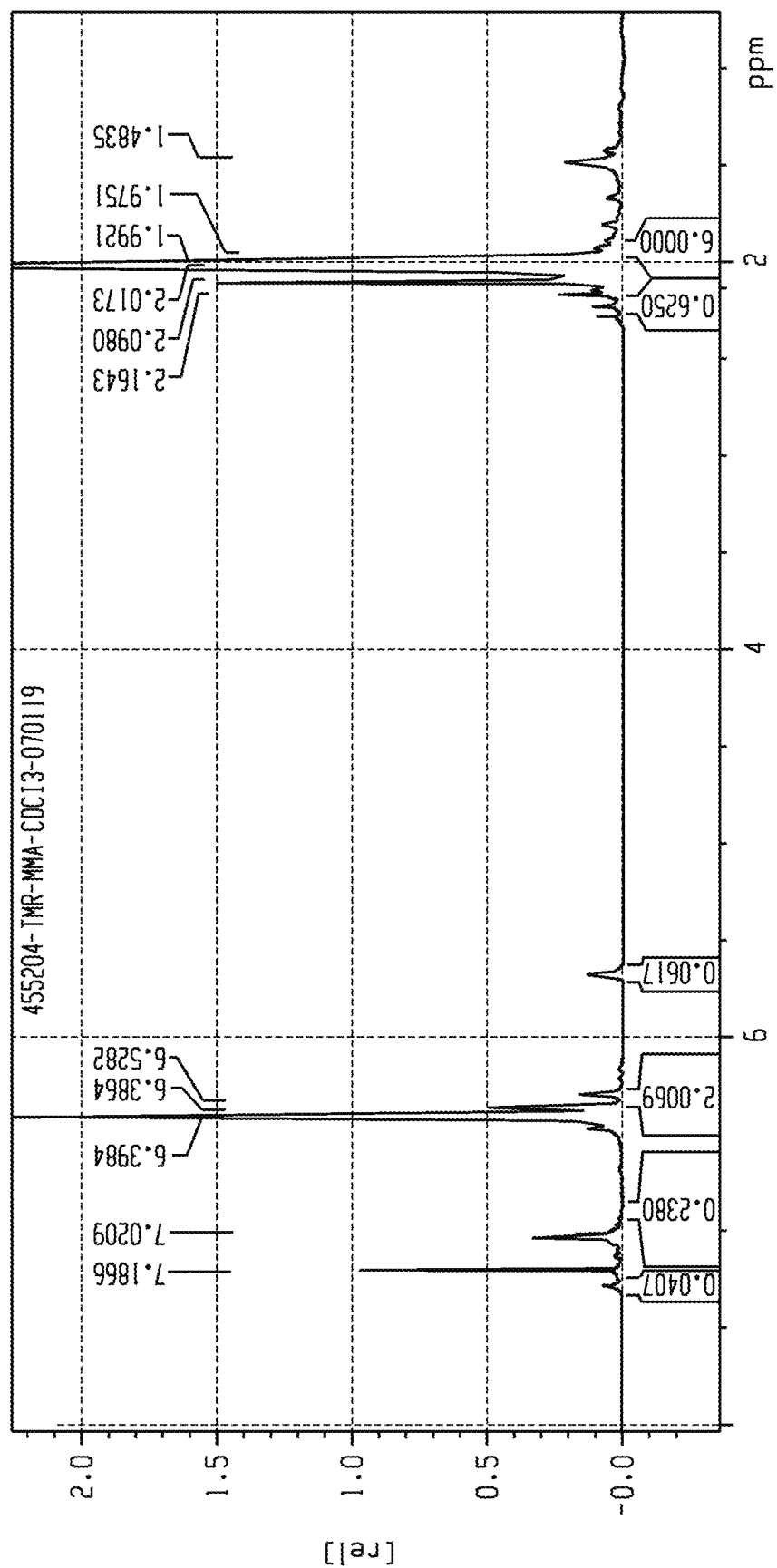
FIG. 3 shows a $^1$H NMR spectrum of a methacrylate-terminated poly(phenylene ether) including a trimethylresorcinol unit.

The structure of the methacrylate end-capped poly(phenylene ether) having a 2,4,6-trimethylresorcinol unit was confirmed by $^1$H NMR spectroscopy as shown in FIG. 3. The vinyl benzyl ether end-capped poly(phenylene ether) exhibited an intrinsic viscosity of 0.0708 dL/g, as determined by Ubbelohde viscometer in chloroform.

This disclosure further encompasses the following aspects.

Aspect 1: A functional phenylene ether oligomer of the structure

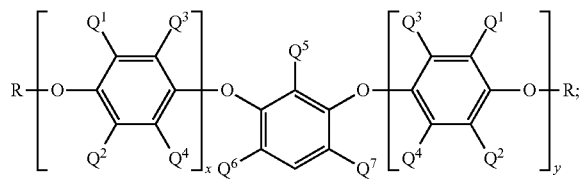

wherein $Q^1$ and $Q^2$ are each independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; $Q^3$ and $Q^4$ are each independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; $Q^5$, $Q^6$ and $Q^7$ are each independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms, preferably wherein $Q^5$, $Q^6$ and $Q^7$ are each methyl; x and y are each independently 0-30, provided that the sum of x and y is at least 2; and R is independently at each occurrence a group containing unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, or an allylhydroxypropyl.

Aspect 2: The functional phenylene ether oligomer of aspect 1, wherein each occurrence of R is independently a vinyl benzyl group, an allyl group, a nitrile group, an acrylate group, or a methacrylate group.

Aspect 3: The functional oligomer of aspect 1 or 2, wherein the oligomer has an intrinsic viscosity of 0.04-0.2, preferably 0.06-0.09 deciliter per gram.

Aspect 4: The functional oligomer of any one or more of aspects 1-3, wherein the oligomer has a number average molecular weight of 600-4,500 grams per mole, determined by gel permeation chromatography relative to polystyrene standards in chloroform.

Aspect 5: The functional phenylene ether oligomer of any one or more of aspects 1-4, wherein each occurrence of $Q^5$, $Q^6$ and $Q^7$ are methyl and the phenylene ether oligomer is of the structure

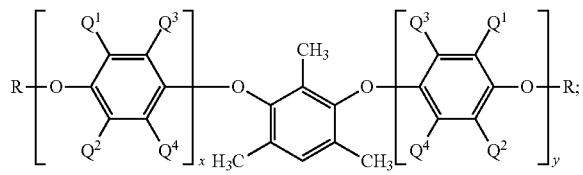

wherein $Q^1$, $Q^2$, $Q^3$, $Q^4$, R, x and y are as defined in aspect 1.

Aspect 6: The functional phenylene ether oligomer of any one or more of aspects 1-5, wherein each occurrence of $Q^1 Q^2$, $Q^5$, $Q^6$ and $Q^7$ are methyl and each occurrence of $Q^3$ and $Q^4$ are hydrogen and the phenylene ether oligomer is of the structure

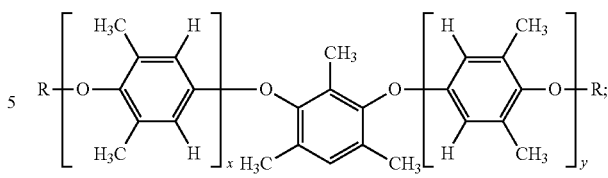

wherein R, x and y are as defined in aspect 1.

Aspect 7: A method of making the functional phenylene ether oligomer of any one or more of aspects 1-6, the method comprising oxidatively polymerizing a monohydric phenol in the presence of a catalyst and trisubstituted resorcinol, preferably trimethyl resorcinol, to provide a phenylene ether oligomer; and combining the phenylene ether oligomer with a compound comprising unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, or an allylhydroxypropyl to provide the functional phenylene ether oligomer.

Aspect 8: A curable composition comprising the functional phenylene ether oligomer of any one or more of aspects 1-6; and a curing promoter.

Aspect 9: The curable composition of aspect 8, further comprising an auxiliary curable resin, a curable unsaturated monomer composition, or both, preferably wherein the auxiliary curable resin comprises an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof, and the curable unsaturated monomer composition comprises a monofunctional styrenic compound, a monofunctional (meth)acrylic compound, a polyfunctional allylic compound, a polyfunctional (meth)acrylate, a polyfunctional (meth)acrylamide, a polyfunctional styrenic compound, or a combination thereof.

Aspect 10: A thermoset composition comprising a cured product of the composition of aspect 8 or 9.

Aspect 11: The thermoset composition of aspect 10, having a glass transition temperature of greater than or equal to 180° C., preferably greater than or equal to 190° C., more preferably greater than or equal to 200° C.

Aspect 12: An article comprising the thermoset composition of aspect 10 or 11.

Aspect 13: The article of aspect 12, wherein the article is in the form of a composite, a foam, a fiber, a layer, a coating, an encapsulant, an adhesive, a sealant, a molded component, a prepreg, a casing, or a combination comprising at least one of the foregoing.

Aspect 14: A method for the manufacture of a thermoset composition, the method comprising curing the curable composition of aspects 8 or 9, preferably at a temperature of 50-250° C.

Aspect 15: The method of aspect 14, wherein the curing comprises injecting the curable composition into a mold, and curing the injected composition at 150-250° C. in the mold.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first", "second", and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety, including priority European patent application no. 18171054.2, filed May 7, 2018. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl)a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:
1. A functional phenylene ether oligomer of the structure

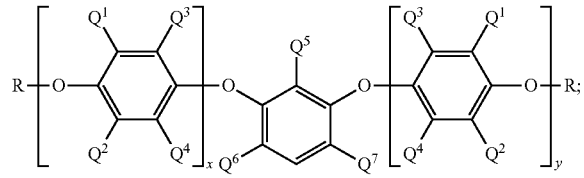

wherein
Q$^1$ and Q$^2$ are each independently halogen, unsubstituted or substituted C$_{1-12}$ primary or secondary hydrocarbyl, C$_{1-12}$ hydrocarbylthio, C$_{1-12}$ hydrocarbyloxy, or C$_{2-12}$ halohydrocarbyloxy wherein at least two carbon atoms separate the halogen and oxygen atoms;
Q$^3$ and Q$^4$ are each independently hydrogen, halogen, unsubstituted or substituted C$_{1-12}$ primary or secondary hydrocarbyl, C$_{1-12}$ hydrocarbylthio, C$_{1-12}$ hydrocarbyloxy, or C$_{2-12}$ halohydrocarbyloxy wherein at least two carbon atoms separate the halogen and oxygen atoms;

$Q^5$, $Q^6$ and $Q^7$ are each independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms, preferably wherein $Q^5$, $Q^6$ and $Q^7$ are each methyl;

x and y are each independently 0-30, provided that the sum of x and y is at least 2; and R is independently at each occurrence a group containing unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, or an allylhydroxypropyl.

2. The functional phenylene ether oligomer of claim 1, wherein each occurrence of R is independently a vinyl benzyl group, an allyl group, a nitrile group, an acrylate group, or a methacrylate group.

3. The functional oligomer of claim 1, wherein the oligomer has an intrinsic viscosity of 0.04-0.2 deciliter per gram.

4. The functional oligomer of claim 1, wherein the oligomer has a number average molecular weight of 600-4,500 grams per mole, determined by gel permeation chromatography relative to polystyrene standards in chloroform.

5. The functional phenylene ether oligomer of claim 1, wherein each occurrence of $Q^5$, $Q^6$ and $Q^7$ are methyl and the phenylene ether oligomer is of the structure

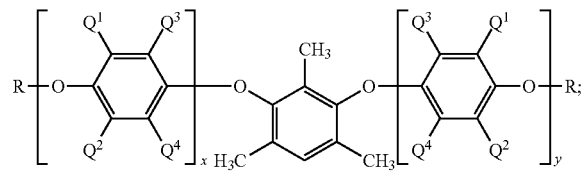

wherein $Q^1$, $Q^2$, $Q^3$, $Q^4$, R, x and y are as defined in claim 1.

6. The functional phenylene ether oligomer of claim 1, wherein each occurrence of $Q^1 Q^2$, $Q^5$, $Q^6$ and $Q^7$ are methyl and each occurrence of $Q^3$ and $Q^4$ are hydrogen and the phenylene ether oligomer is of the structure

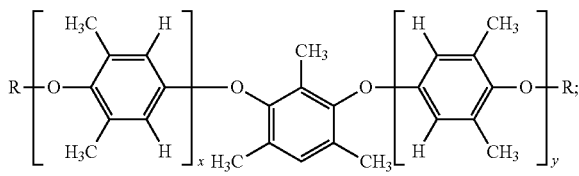

wherein R, x and y are as defined in claim 1.

7. A method of making the functional phenylene ether oligomer of claim 1, the method comprising oxidatively polymerizing a monohydric phenol in the presence of a catalyst and trisubstituted resorcinol to provide a phenylene ether oligomer; and combining the phenylene ether oligomer with a compound comprising unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, or an allylhydroxypropyl to provide the functional phenylene ether oligomer.

8. A curable composition comprising
the functional phenylene ether oligomer of claim 1; and
a curing promoter.

9. The curable composition of claim 8, further comprising an auxiliary curable resin, a curable unsaturated monomer composition, or both.

10. A thermoset composition comprising a cured product of the composition of claim 8.

11. The thermoset composition of claim 10, having a glass transition temperature of greater than or equal to 180° C.

12. An article comprising the thermoset composition of claim 10.

13. The article of claim 12, wherein the article is in the form of a composite, a foam, a fiber, a layer, a coating, an encapsulant, an adhesive, a sealant, a molded component, a prepreg, a casing, or a combination comprising at least one of the foregoing.

14. A method for the manufacture of a thermoset composition, the method comprising curing the curable composition of claim 8.

15. The method of claim 14, wherein the curing comprises injecting the curable composition into a mold, and curing the injected composition at 150-250° C. in the mold.

* * * * *